US009523800B2

(12) United States Patent
Veldman et al.

(10) Patent No.: US 9,523,800 B2
(45) Date of Patent: Dec. 20, 2016

(54) COMPUTATION EFFICIENCY BY ITERATIVE SPATIAL HARMONICS ORDER TRUNCATION

(75) Inventors: Andrei Veldman, Santa Clara, CA (US); John J. Hench, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 1795 days.

(21) Appl. No.: 12/785,310

(22) Filed: May 21, 2010

(65) Prior Publication Data

US 2011/0288822 A1    Nov. 24, 2011

(51) Int. Cl.
G06F 7/60      (2006.01)
G06G 7/48      (2006.01)
G02B 5/18      (2006.01)

(52) U.S. Cl.
CPC .................................. *G02B 5/1847* (2013.01)

(58) Field of Classification Search
CPC .................................................. G02B 5/1847
USPC ........................................................ 703/2, 6
See application file for complete search history.

(56) References Cited

U.S. PATENT DOCUMENTS

| 6,445,852 | B1 | 9/2002 | Feced et al. | |
|---|---|---|---|---|
| 7,428,060 | B2 * | 9/2008 | Jin et al. | 356/601 |
| 7,990,549 | B2 * | 8/2011 | Walsh | 356/612 |

| 2003/0187604 | A1 | 10/2003 | Drege et al. |
|---|---|---|---|
| 2004/0090629 | A1 | 5/2004 | Drege et al. |
| 2006/0221796 | A1 | 10/2006 | Thomas, III |
| 2008/0129986 | A1 | 6/2008 | Walsh |
| 2009/0231712 | A1 | 9/2009 | Ushigome |
| 2009/0262364 | A1 | 10/2009 | Primot et al. |

FOREIGN PATENT DOCUMENTS

| CN | 101410692 | 4/2009 |
|---|---|---|
| JP | 2004-509341 | 3/2004 |
| JP | 2009-530866 | 8/2009 |
| JP | 2009-217139 | 9/2009 |
| WO | WO-02/23231 | 3/2002 |
| WO | WO-2007/112022 | 10/2007 |

OTHER PUBLICATIONS

International Search Report and Written Opinion from PCT/US2011/037030 mailed Dec. 22, 2011, 8 pgs.

(Continued)

*Primary Examiner* — Kamini S Shah
*Assistant Examiner* — Juan Ochoa
(74) *Attorney, Agent, or Firm* — Blakely Sokoloff Taylor Zafman LLP

(57) ABSTRACT

A method for improving computation efficiency for diffraction signals in optical metrology is described. The method includes simulating a set of spatial harmonics orders for a grating structure. The set of spatial harmonics orders is truncated to provide a first truncated set of spatial harmonics orders based on a first pattern. The first truncated set of spatial harmonics orders is modified by an iterative process to provide a second truncated set of spatial harmonics orders based on a second pattern, the second pattern different from the first pattern. Finally, a simulated spectrum is provided based on the second truncated set of spatial harmonics orders.

8 Claims, 11 Drawing Sheets

(56) References Cited

OTHER PUBLICATIONS

International Preliminary Report on Patentability from PCT/US2011/037030 mailed Dec. 6, 2012, 5 pgs.
First Notification of Office Action dated Jul. 30, 2014 (+ English translation), in Chinese Patent Application No. 201180025313.7, 39 pages.
Notice of the Reason for Refusal dated May 26, 2015 (+ English translation), in Japanese Patent Application No. 2013-512086, 5 pages.

* cited by examiner $$\begin{pmatrix} E_{1mn} \\ E_{2mn} \\ H_{1mn} \\ H_{2mn} \end{pmatrix} = \begin{bmatrix} E_{1mnq} & E_{1mnq} \\ E_{2mnq} & E_{2mnq} \\ H_{1mnq} & -H_{1mnq} \\ H_{2mnq} & -H_{2mnq} \end{bmatrix}$$

$$\times \begin{bmatrix} \exp(i\gamma_q x^3) & 0 \\ 0 & \exp(-i\gamma_q x^3) \end{bmatrix} \begin{pmatrix} u_q \\ d_q \end{pmatrix}$$

FIG. 5

$$J = \frac{\partial R_{0\,TE|TM}}{\partial CD_{x|y,top|bottom}}$$

$$S = \sqrt{\frac{\sum_n S_\lambda^2}{n-1}}$$

$$S_\lambda = \frac{(R_{CD-\Delta CD}(\lambda) - R_{CD}(\lambda))}{R_{CD}(\lambda)}$$

FIG. 6

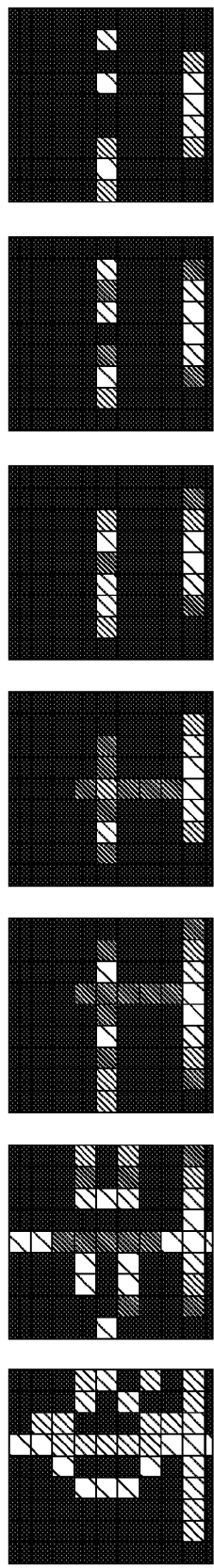
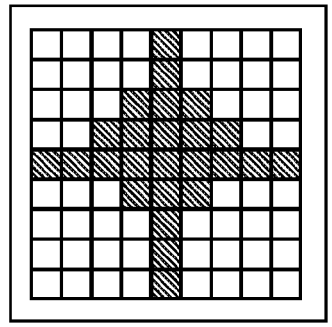
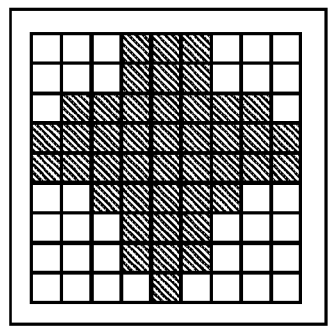
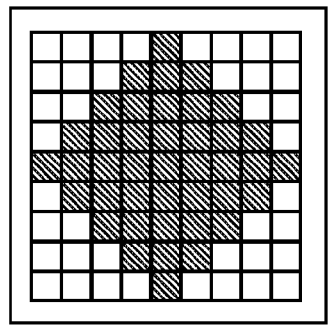
FIG. 9A
FIG. 9B

COMPUTATION EFFICIENCY BY ITERATIVE SPATIAL HARMONICS ORDER TRUNCATION

TECHNICAL FIELD

Embodiments of the present invention are in the field of Optical Metrology, and, more particularly, relate to the selection of the number of spatial harmonics orders to use in generating a simulated diffraction signal for use in optical metrology measurement, processing, or simulation for grating structures.

BACKGROUND

For the past several years, a rigorous couple wave analysis (RCWA) and similar algorithms have been widely used for the study and design of diffraction structures. In the RCWA approach, the profiles of periodic structures are approximated by a given number of sufficiently thin planar grating slabs. Specifically, RCWA involves three main steps, namely, the Fourier expansion of the electric and magnetic fields inside the grating, calculation of the eigenvalues and eigenvectors of a constant coefficient matrix that characterizes the diffracted signal, and solution of a linear system deduced from the boundary matching conditions. RCWA divides the problem into three distinct spatial regions: 1) the ambient region supporting the incident plane wave field and a summation over all reflected diffracted orders, 2) the grating structure and underlying non-patterned layers in which the wave field is treated as a superposition of modes associated with each diffracted order, and 3) the substrate containing the transmitted wave field.

The accuracy of the RCWA solution depends, in part, on the number of terms retained in the space-harmonic expansion of the wave fields, with conservation of energy being satisfied in general. The number of terms retained is a function of the number of spatial harmonics orders considered during the calculations. Efficient generation of a simulated diffraction signal for a given hypothetical profile involves selection of the optimal set of spatial harmonics orders at each wavelength for both transverse-magnetic (TM) and/or transverse-electric (TE) components of the diffraction signal. Mathematically, the more spatial harmonics orders selected, the more accurate the simulations. However, the higher the number of spatial harmonics orders, the more computation is required for calculating the simulated diffraction signal. Moreover, the computation time is a nonlinear function of the number of orders used. Thus, it is useful to minimize the number of spatial harmonics orders simulated at each wavelength. However, the number of spatial harmonics orders cannot arbitrarily be minimized as this might result in loss of information.

The importance of selecting the appropriate number of spatial harmonics orders increases significantly when three-dimensional structures are considered in comparison to two-dimensional structures. Since the selection of the number of spatial harmonics orders is application specific, efficient approaches for selecting the number of spatial harmonics orders is desirable.

SUMMARY

Embodiments of the present invention include methods for improving computation efficiency for diffraction signals in optical metrology.

In an embodiment, a method includes simulating a set of spatial harmonics orders for a grating structure. The set of spatial harmonics orders is truncated to provide a first truncated set of spatial harmonics orders based on a first pattern. The first truncated set of spatial harmonics orders is modified by an iterative process to provide a second truncated set of spatial harmonics orders based on a second pattern, the second pattern different from the first pattern. A simulated spectrum is provided based on the second truncated set of spatial harmonics orders.

In another embodiment, a method includes simulating a set of spatial harmonics orders for a grating structure. The set of spatial harmonics orders is truncated to provide a first truncated set of spatial harmonics orders based on a first pattern. One or more individual spatial harmonics orders is subtracted from the first truncated set of spatial harmonics orders, by an iterative process, to provide a second truncated set of spatial harmonics orders based on a second pattern, the second pattern different from the first pattern. One or more individual spatial harmonics orders is added to the second truncated set of spatial harmonics orders, by an iterative process, to provide a third truncated set of spatial harmonics orders based on a third pattern, the third pattern different from the first and second patterns. A simulated spectrum is provided based on the third truncated set of spatial harmonics orders.

In another embodiment, a computer-readable medium has stored thereon a set of instructions. The set of instructions is included to perform a method including simulating a set of spatial harmonics orders for a grating structure, truncating the set of spatial harmonics orders to provide a first truncated set of spatial harmonics orders based on a first pattern, modifying, by an iterative process, the first truncated set of spatial harmonics orders to provide a second truncated set of spatial harmonics orders based on a second pattern, the second pattern different from the first pattern, and providing a simulated spectrum based on the second truncated set of spatial harmonics orders.

In yet another embodiment, a computer-readable medium has stored thereon a set of instructions. The set of instructions is included to perform a method including simulating a set of spatial harmonics orders for a grating structure, truncating the set of spatial harmonics orders to provide a first truncated set of spatial harmonics orders based on a first pattern, subtracting, by an iterative process, one or more individual spatial harmonics orders from the first truncated set of spatial harmonics orders to provide a second truncated set of spatial harmonics orders based on a second pattern, the second pattern different from the first pattern, adding, by an iterative process, one or more individual spatial harmonics orders to the second truncated set of spatial harmonics orders to provide a third truncated set of spatial harmonics orders based on a third pattern, the third pattern different from the first and second patterns, and providing a simulated spectrum based on the third truncated set of spatial harmonics orders.

BRIEF DESCRIPTION OF THE DRAWINGS

FIG. 5 represents the Fourier coefficients of the tangential components of the total fields in terms of the unknown field amplitudes and, thus, represents an equation for expressing the S-matrix in one slice or layer, in accordance with an embodiment of the present invention.

FIG. 6 represents equations for use in applying the Jacobi method to prioritize spatial harmonics orders within a simulated set of spatial harmonics orders, in accordance with an embodiment of the present invention.

FIG. 9A illustrates an approach using initial shape shortcutting based on electric field spectra, in accordance with an embodiment of the present invention.

FIG. 9B illustrates an approach using initial shape shortcutting based on electric field spectra, in accordance with an embodiment of the present invention.

DETAILED DESCRIPTION

Figure 1:
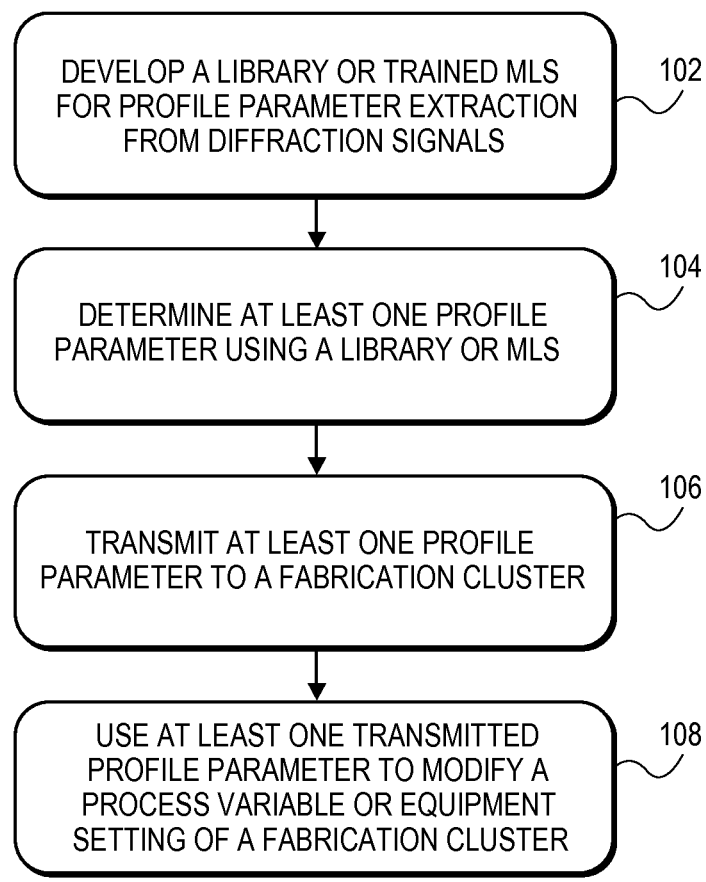
FIG. 1 depicts a Flowchart representing an exemplary series of operations for determining and utilizing profile parameters for automated process and equipment control, in accordance with an embodiment of the present invention.

Methods for computation efficiency by optimized iterative order truncation are described herein. In the following description, numerous specific details are set forth, such as specific iteratively determined truncated diffraction patterns, in order to provide a thorough understanding of embodiments of the present invention. It will be apparent to one skilled in the art that embodiments of the present invention may be practiced without these specific details. In other instances, well-known processing steps, such as fabricating stacks of patterned material layers, are not described in detail in order to not unnecessarily obscure embodiments of the present invention. Furthermore, it is to be understood that the various embodiments shown in the Figures are illustrative representations and are not necessarily drawn to scale.

Disclosed herein is a method for improving computation efficiency for diffraction signals in optical metrology. A set of spatial harmonics orders for a grating structure may be determined. In accordance with an embodiment of the present invention, the set of spatial harmonics orders is truncated to provide a first truncated set of spatial harmonics orders based on a first pattern. The first truncated set of spatial harmonics orders is modified by an iterative process to provide a second truncated set of spatial harmonics orders based on a second pattern, the second pattern different from the first pattern. A simulated spectrum is provided based on the second truncated set of spatial harmonics orders.

Orders of a diffraction signal may be simulated as being derived from a periodic structure. The zeroth order represents a diffracted signal at an angle equal to the angle of incidence of a hypothetical incident beam, with respect to the normal N of the periodic structure. Higher diffraction orders are designated as +1, +2, +3, −1, −2, −3, etc. Other orders known as evanescent orders may also be considered. In accordance with an embodiment of the present invention, a simulated diffraction signal is generated for use in optical metrology. In one embodiment, efficient generation of a simulated diffraction signal for a given structure profile involves selecting the number of spatial harmonics orders that provide sufficient diffraction information without overly increasing the computational steps to perform diffraction simulations.

A forward simulation algorithm for diffraction patterns generated from three-dimensional structures can be very time consuming to perform. For example, the use of many spatial harmonics orders may result in a very costly calculation process. However, in accordance with an embodiment of the present invention, some of the orders play a more important role than others. Thus, in one embodiment, there are certain orders that can be omitted prior to performing a computation process based on a set of spatial harmonics orders. Accordingly, a set of spatial harmonics orders determined from a simulated diffraction pattern for a hypothetical three-dimensional structure may be iteratively truncated to provide a modified or reduced set of spatial harmonics orders. This more efficient computation process may be enabled by first identifying and sorting the spatial harmonics orders prior to performing the computation. In a specific embodiment, a simulated spectrum is determined based on calculations involving the truncated set of spatial harmonics orders. The simulated spectrum may then be compared to a sample spectrum.

In accordance with an embodiment of the present invention, three techniques of automating and optimizing the selection of spatial harmonics orders are considered: (a) selective reduction of spatial harmonics orders (i) with a selected shape large enough to include all the core spatial harmonics orders, selectively discarding the spatial harmonics order in the periphery of the selected shape that is the "least important" (e.g., the spatial harmonics order with least impact on computed optical response) to the spectra simulation, and (ii) iteration if operation (i) until the error of the simulated signal is equal to or exceeds a preset threshold error; (b) selective addition of spatial harmonics orders (i) with the selected shape small enough to include only a portion of the core spatial harmonics orders, selectively adding a spatial harmonics order outside the periphery of the selected shape that is the "most important" (e.g., the spatial harmonics order with most impact on computed optical response) to the spectra simulation, and (ii) iteration of operation (i) until the added accuracy of the simulated signal is less than a preset value; (c) field based processing of spatial harmonics orders to (i) calculate the values of the electric field in Fourier space of the metrology setup, (ii) determining the center of the electric field, using pervious data or an equation, (iii) using the center of the electric field, determining an initial shape, e.g. a circle, to be positioned in proximity to the center of the electric field determined in operation (ii), and (iv) the process described in (a) or (b) may be used to determine spatial harmonics orders to discard or spatial harmonics orders to add to the spatial harmonics orders within the initial shape.

In one embodiment, the spatial harmonics orders may be orthogonal or non-orthogonal in distribution. In one embodiment, the spatial harmonics orders may have the same or different pitches in the first and second dimension. In one embodiment, the initial shape can be a regular geometric shape or an arbitrary shape. In one embodiment, deletion of spatial harmonics orders is not limited to orders closest to the periphery and may be anywhere within the initial shape using method (a), thereby creating a "hole". In one embodiment, addition of new spatial harmonics orders is not limited to those orders closest to the periphery of the initial shape using method (b), thereby creating a composite shape that includes more than one shape. In one embodiment, the criteria for selecting a spatial harmonics order to discard or add may include an error target and a measure of the speed of simulation.

Calculations based on an iteratively truncated set of simulated spatial harmonics orders may be indicative of profile parameters for a patterned film, such as a patterned semiconductor film or photo-resist layer, and may be used for calibrating automated processes or equipment control. FIG. 1 depicts a Flowchart 100 representing an exemplary series of operations for determining and utilizing profile parameters for automated process and equipment control, in accordance with an embodiment of the present invention.

Referring to operation 102 of Flowchart 100, a library or trained machine learning systems (MLS) is developed to extract profile parameters from a set of measured diffraction signals. In operation 104, at least one profile parameter of a structure is determined using the library or the trained MLS. In operation 106, the at least one profile parameter is transmitted to a fabrication cluster configured to perform a processing step, where the processing step may be executed in the semiconductor manufacturing process flow either before or after measurement step 104 is made. In operation 108, the at least one transmitted profile parameter is used to modify a process variable or equipment setting for the processing step performed by the fabrication cluster. For a more detailed description of machine learning systems and algorithms, see U.S. patent application Ser. No. 10/608,300, entitled OPTICAL METROLOGY OF STRUCTURES FORMED ON SEMICONDUCTOR WAFERS USING MACHINE LEARNING SYSTEMS, filed on Jun. 27, 2003, which is incorporated herein by reference in its entirety. For a description of spatial harmonics order optimization for two dimensional repeating structures, see U.S. patent application Ser. No. 11/388,265, entitled OPTIMIZATION OF DIFFRACTION ORDER SELECTION FOR TWO-DIMENSIONAL STRUCTURES, filed on Mar. 24, 2006, which is incorporated herein by reference in its entirety.

Figure 2:
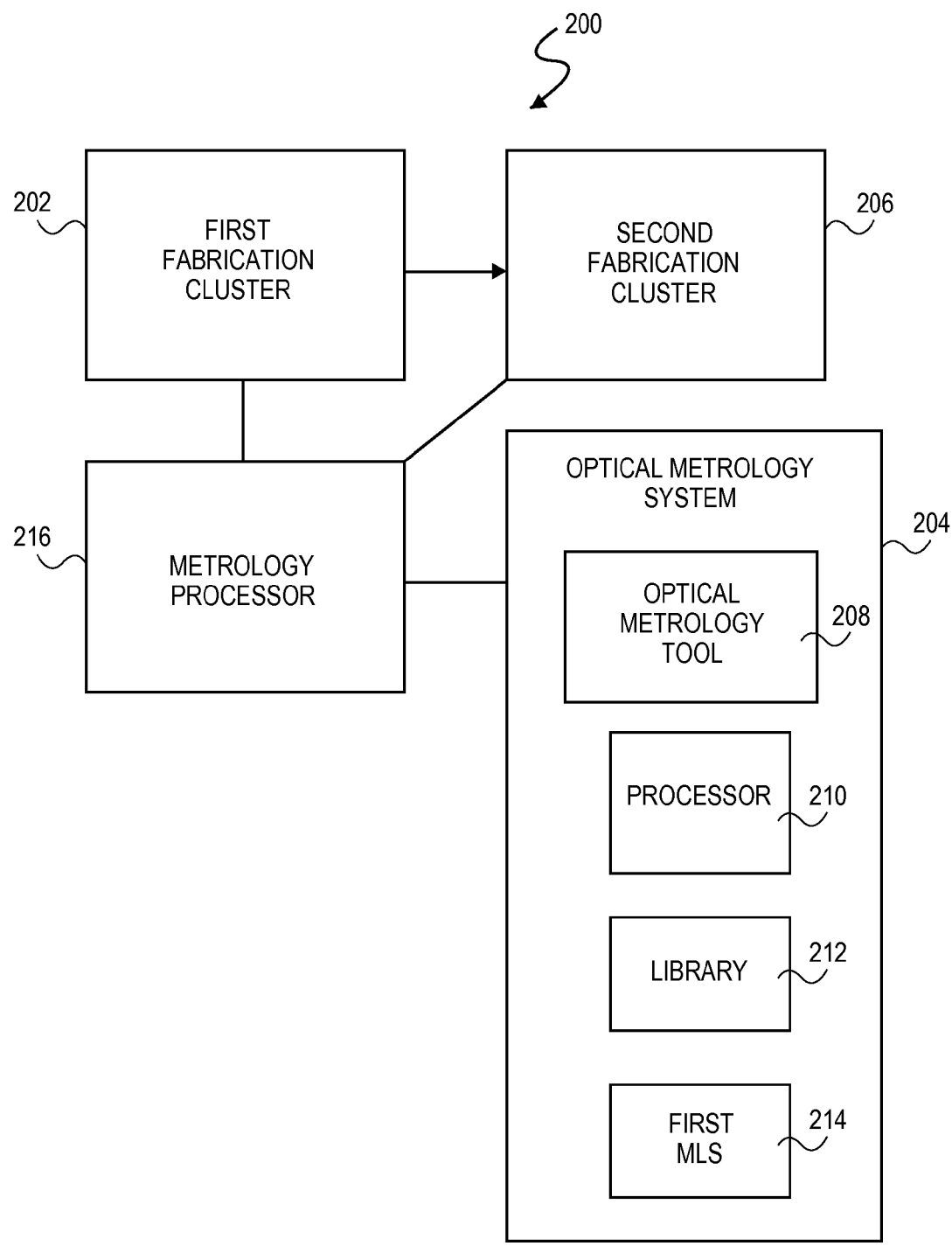
FIG. 2 is an exemplary block diagram of a system for determining and utilizing profile parameters for automated process and equipment control, in accordance with an embodiment of the present invention.

FIG. 2 is an exemplary block diagram of a system 200 for determining and utilizing profile parameters for automated process and equipment control, in accordance with an embodiment of the present invention. System 200 includes a first fabrication cluster 202 and optical metrology system 204. System 200 also includes a second fabrication cluster 206. Although the second fabrication cluster 206 is depicted in FIG. 2 as being subsequent to first fabrication cluster 202, it should be recognized that second fabrication cluster 206 can be located prior to first fabrication cluster 202 in system 200 (and, e.g., in the manufacturing process flow).

A photolithographic process, such as exposing and developing a photo-resist layer applied to a wafer, can be performed using first fabrication cluster 202. In one exemplary embodiment, optical metrology system 204 includes an optical metrology tool 208 and processor 210. Optical metrology tool 208 is configured to measure a diffraction signal obtained from the structure. If the measured diffraction signal and the simulated diffraction signal match, one or more values of the profile parameters are determined to be the one or more values of the profile parameters associated with the simulated diffraction signal.

In one exemplary embodiment, optical metrology system 204 can also include a library 212 with a plurality of simulated diffraction signals and a plurality of values of one or more profile parameters associated with the plurality of simulated diffraction signals. As described above, the library can be generated in advance. Metrology processor 210 can compare a measured diffraction signal obtained from a structure to the plurality of simulated diffraction signals in the library. When a matching simulated diffraction signal is found, the one or more values of the profile parameters associated with the matching simulated diffraction signal in the library is assumed to be the one or more values of the profile parameters used in the wafer application to fabricate the structure.

System 200 also includes a metrology processor 216. In one exemplary embodiment, processor 210 can transmit the one or more values of the one or more profile parameters to metrology processor 216. Metrology processor 216 can then adjust one or more process parameters or equipment settings of first fabrication cluster 202 based on the one or more values of the one or more profile parameters determined using optical metrology system 204. Metrology processor 216 can also adjust one or more process parameters or equipment settings of the second fabrication cluster 206 based on the one or more values of the one or more profile parameters determined using optical metrology system 204. As noted above, fabrication cluster 206 can process the wafer before or after fabrication cluster 202. In another exemplary embodiment, processor 210 is configured to train machine learning system 214 using the set of measured diffraction signals as inputs to machine learning system 214 and profile parameters as the expected outputs of machine learning system 214.

Figure 3:
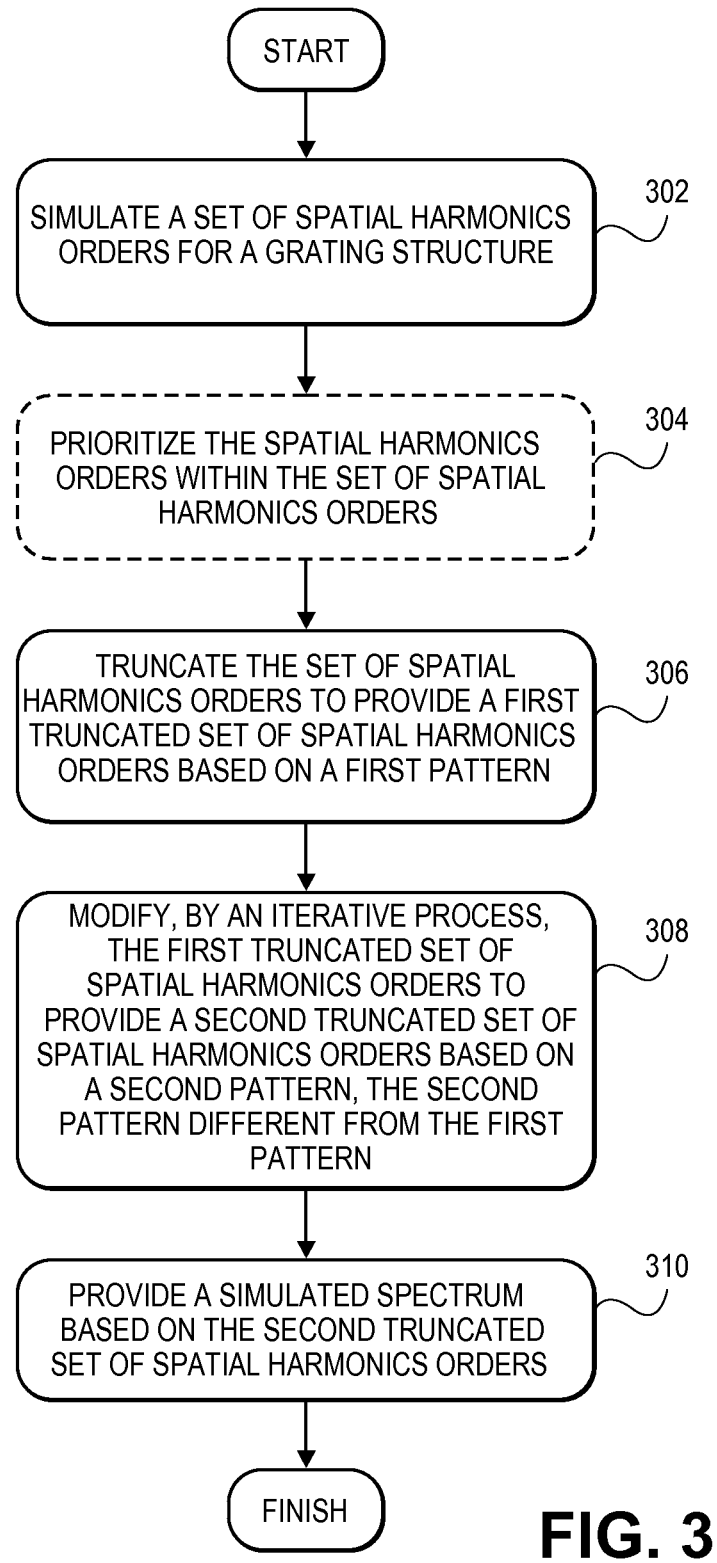
FIG. 3 depicts a Flowchart representing an exemplary series of operations for improving computation efficiency for simulated diffraction signals in optical metrology, in accordance with an embodiment of the present invention.

In an aspect of the present invention, the computation efficiency for calculations based on spatial harmonics orders, obtained from simulated diffractions signals, is improved for optical metrology applications by iteratively truncating a set of spatial harmonics orders prior to performing the calculations. FIG. 3 depicts a Flowchart 300 representing an exemplary series of operations for improving computation efficiency for simulated diffraction signals in optical metrology, in accordance with an embodiment of the present invention.

Referring to operation 302 of Flowchart 300, a set of spatial harmonics orders is simulated for a grating structure.

Figure 4A:
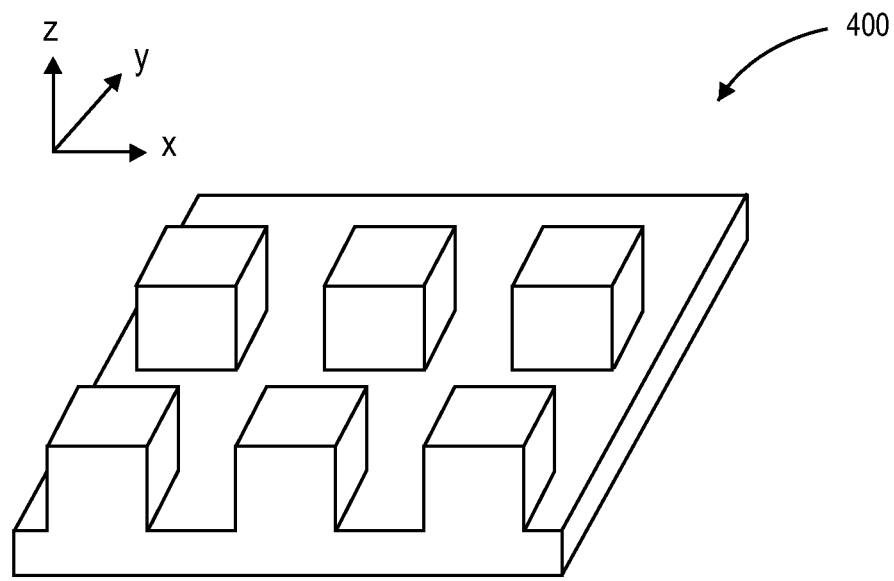
FIG. 4A depicts a periodic grating 400 having a profile that varies in the x-y plane, in accordance with an embodiment of the present invention.
Figure 4B:
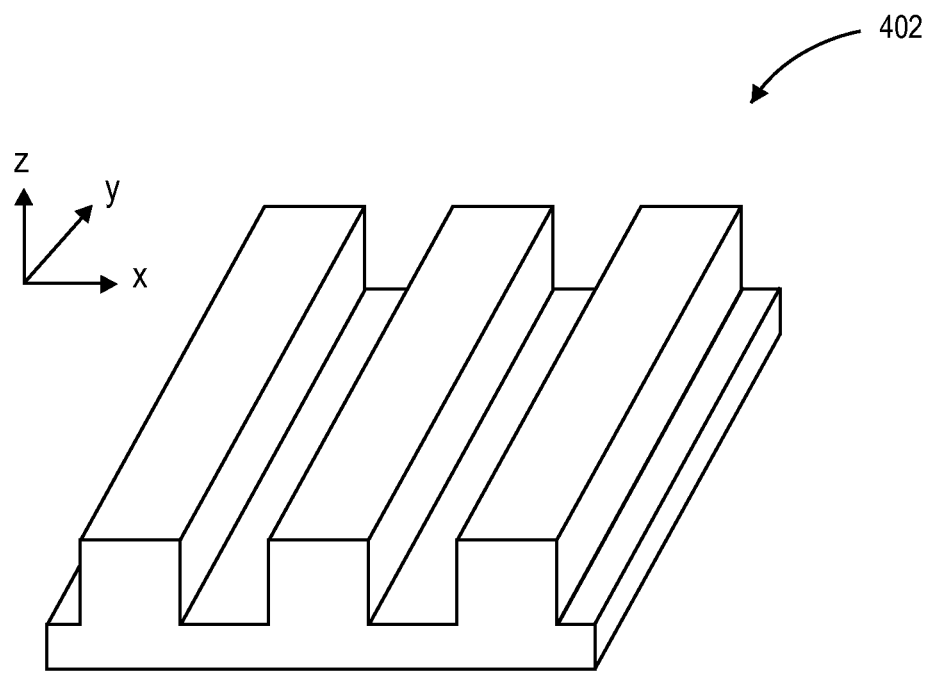
FIG. 4B depicts a periodic grating 402 having a profile that varies in the x-direction but not in the y-direction, in accordance with an embodiment of the present invention.

The grating structure may be a three-dimensional structure or a two-dimensional structure. The term "three-dimensional structure" is used herein to refer to a structure having an x-y profile that varies in two dimensions in addition to a depth in the z-direction. For example, FIG. 4A depicts a periodic grating 400 having a profile that varies in the x-y plane, in accordance with an embodiment of the present invention. The profile of the periodic grating varies in the z-direction as a function of the x-y profile. By comparison, the term "two-dimensional structure" is used herein to refer to a structure having an x-y profile that varies in only one dimension in addition to a depth in the z-direction. For example, FIG. 4B depicts a periodic grating 402 having a profile that varies in the x-direction but not in the y-direction, in accordance with an embodiment of the present invention. The profile of the periodic grating varies in the z-direction as a function of the x profile. It is to be understood that the lack of variation in the y-direction for a two-dimensional structure need not be infinite, but any breaks in the pattern are considered long range, i.e. any breaks in the pattern in the y-direction are spaced substantially further apart than the breaks in the pattern in the x-direction.

In accordance with an embodiment of the present invention, the set of spatial harmonics orders is simulated to represent diffraction signals from a grating structure generated by an ellipsometric optical metrology system, such as the optical metrology system 1100 described below in association with FIG. 11. However, it is to be understood that the same concepts and principles may equally apply to the other optical metrology systems, such as reflectometric systems or any system that simulates diffraction. The diffraction signals represented may account for features of the grating structure such as, but not limited to, profile, dimensions, material composition or material optical property (e.g., complex index of refraction). In one embodiment, the size of the set of spatial harmonics orders, e.g., the number of spatial harmonics orders initially simulated, is of finite size and greater than the number of spatial harmonics orders needed computationally to satisfactorily generate a representative diffraction signal, or representative spectrum, etc. based on the set of spatial harmonics orders. In a specific embodiment, the size of the set of simulated spatial harmonics orders is of a size sufficient to undergo an iterative truncation process, e.g., to undergo an initial removal of some of the spatial harmonics orders and subsequent iterative subtraction of or iterative addition of individual orders, wherein the iterative truncation process provides a second truncated set of simulated spatial harmonics orders that may be used to generate a representative spectrum.

Referring to optional operation 304 of Flowchart 300, spatial harmonics orders within the set of simulated spatial harmonics orders may be prioritized. In accordance with an embodiment of the present invention, the spatial harmonics orders are prioritized with highest priority given to those orders that carry the most information regarding the grating structure. In one embodiment, prioritizing the spatial harmonics orders includes identifying their energy distribution in the k-space. In an embodiment, the information associated with the spatial harmonics orders is used directly. For example, in one embodiment, both grating and material information is associated with the spatial harmonics orders in the form of an $\epsilon$-matrix and the $\epsilon$-matrix is used directly to prioritize the spatial harmonics orders.

However, in another embodiment, prioritizing the spatial harmonics orders includes comparing the set of spatial harmonics orders with the final energy distribution of the spatial harmonics orders within the set of spatial harmonics orders. In one embodiment, in order to obtain the final energy distribution of the orders, the s-matrix is transformed to a pure scattering matrix (S-Matrix). To apply an S-matrix algorithm, the Fourier coefficients of the s-matrix need to be expressed in terms of unknown field amplitudes. FIG. 5 represents the Fourier coefficients of the tangential components of the total fields in terms of the unknown field amplitudes and, thus, represents an equation for expressing the S-matrix in one slice or layer, in accordance with an embodiment of the present invention. Referring to the equation of FIG. 5, each matrix element symbolizes a rectangular block matrix. For example, $E_{1mnq}$ represents a matrix whose leading dimension runs through all m and n and whose trailing dimension runs through all q. The Fourier coefficients of the tangential field components ($E_{1mn}$, $E_{2mn}$, $H_{1mn}$, $H_{2mn}$) are expressed in terms of the unknown field amplitudes ($u_q$ and $d_q$). The indices m and n are the Fourier order indices in directions 1 and 2, e.g., x and y for an orthogonal system. The index q is the index for the Eigen solutions and, in one embodiment, $Re(\gamma)+Im(\gamma)>0$. The elements of the first coupling matrix are formed by the Eigen vectors of the Eigen equation, whereas the diagonal elements of the second coupling matrix are diagonal matrices. The variables in the exponential function include $\gamma$ (the square root of $\gamma^2$), $x^3$ (the contra-variant normal coordinate), and i (the square root of −1). Referring again to FIG. 5, the second matrix propagates the (decoupled) up and down waves within a slice or through a certain distance $x^3$. In one embodiment, following the S-matrix algorithm, the unknown Raleigh amplitudes can be calculated. It is to be understood that the S-matrix algorithm has many implementation variants. Also, in a specific embodiment, prioritizing the spatial harmonics orders includes modifying the set of spatial harmonics orders with a coupling matrix. For example, in an embodiment, the $\epsilon$-matrix is transformed to the S-Matrix via first and intermediate transformation to an FG-matrix.

In another embodiment, prioritizing the spatial harmonics orders includes operating on the set of spatial harmonics orders with the Jacobi method. FIG. 6 represents equations for use in applying the Jacobi method to prioritize spatial harmonics orders within a simulated set of spatial harmonics orders, in accordance with an embodiment of the present invention. The Jacobi method is an algorithm in linear algebra for determining the solutions of a system of linear equations with largest absolute values in each row and column dominated by the diagonal element. Each diagonal element is solved for, and an approximate value is plugged in. In one embodiment, the process is then iterated until it converges. Referring to FIG. 6, J is the Jacobi matrix assembled from the derivatives of the signal (e.g., reflectivity, tan $\psi$ and cos $\delta$, ellipsometric $\alpha$ and $\beta$) for a profile or light parameter (e.g., critical dimension (CD), height, slope angle or angle of incidence, azimuth, wavelength, etc.). $S_\lambda$ is the spectral sensitivity, i.e., the normalized signal change caused by a CD (or other profile parameter) change and S is the total sensitivity over a certain wavelength range (summation over $\lambda$).

Referring to operation 306 of Flowchart 300, the simulated set of spatial harmonics orders is truncated to provide a first truncated set of spatial harmonics orders based on a first pattern. In accordance with an embodiment of the present invention, the first pattern is corner-free. In one embodiment, the first pattern is elliptical, e.g., where the elliptical parameters are determined by the periodicity of the diffraction pattern and the direction of illumination of the structure.

Referring to operation 308 of Flowchart 300, by an iterative process, the first truncated set of spatial harmonics orders is modified to provide a second truncated set of spatial harmonics orders based on a second pattern, the second pattern different from the first pattern. In accordance with an embodiment of the present invention, modifying the first truncated set of spatial harmonics orders includes subtracting one or more individual spatial harmonics orders to provide the second truncated set of spatial harmonics orders, wherein the second pattern is smaller than the first pattern. In another embodiment, modifying the first truncated set of spatial harmonics orders includes adding one or more individual spatial harmonics orders to provide the second truncated set of spatial harmonics orders, wherein the second pattern is larger than the first pattern. In one such embodiment, the adding is performed such that no significant spatial harmonics orders are omitted. In a particular such embodiment, one or more significant spatial harmonics orders are initially omitted when the initially selected or "guessed" shape is too small in at least one direction.

Referring to operation 310 of Flowchart 300, a simulated spectrum based on the second truncated set of spatial harmonics orders is provided. In accordance with an embodiment of the present invention, by using a truncated set of spatial harmonics orders for the computation, the computation cost for providing the simulated spectrum is lower relative to the cost for a computation based on a complete spatial harmonics order set. Only a negligible amount of information for a grating structure is excluded from the computation because the truncated set was determined by selecting the optimal truncation approach.

In one embodiment, the simulated spectrum obtained from the truncated set of spatial harmonics orders is then compared to a sample spectrum. In a specific embodiment, the sample spectrum is collected from a structure such as, but not limited to, a physical reference sample or a physical production sample. In another specific embodiment, the sample spectrum is collected from a hypothetical structure for which a simulated spectrum is obtained by a method not involving spatial harmonics order truncation. In that embodiment, the quality of the more efficient simulation based on a truncated diffraction set can be determined.

Figure 7:
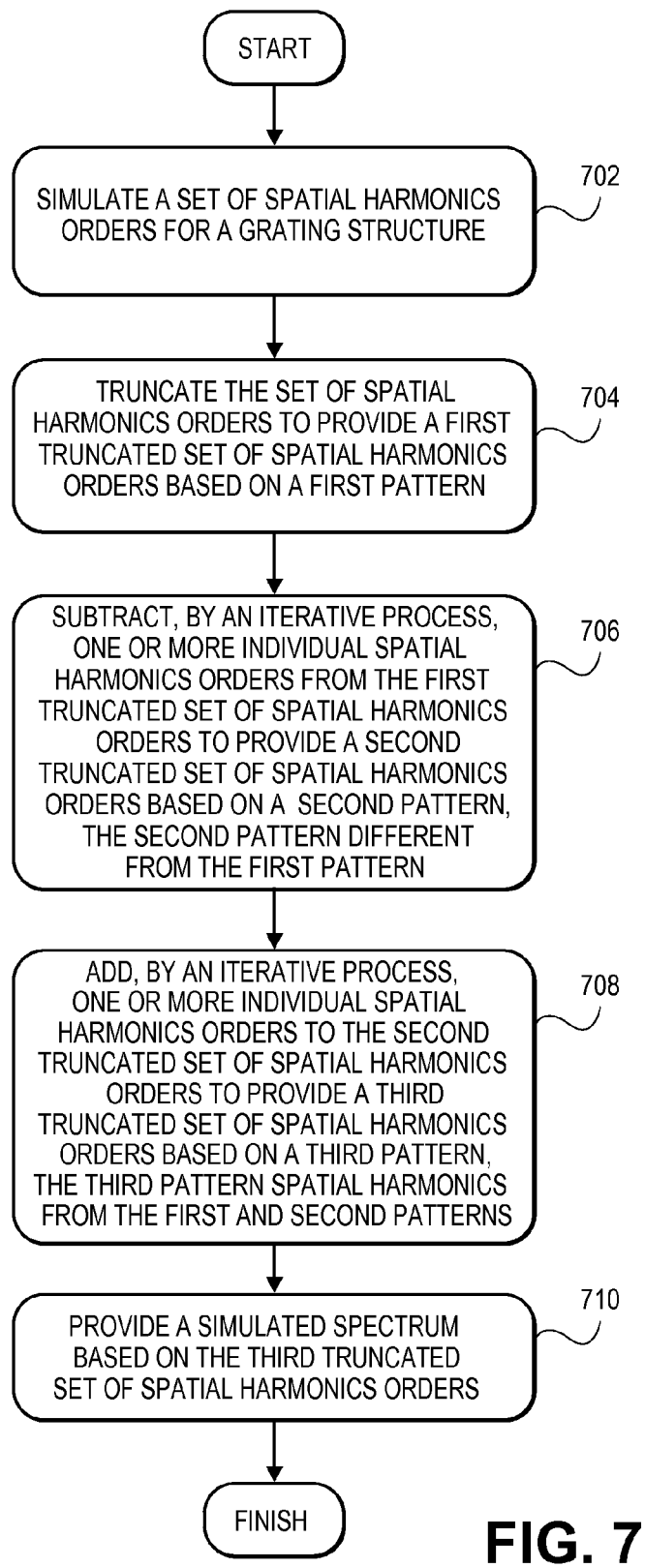
FIG. 7 depicts a Flowchart representing an exemplary series of operations for improving computation efficiency for simulated diffraction signals in optical metrology, in accordance with an embodiment of the present invention.

In another aspect of the present invention, a combination of first subtracting and then adding individual spatial harmonics orders may be applied. For example, FIG. 7 depicts a Flowchart 700 representing an exemplary series of operations for improving computation efficiency for simulated diffraction signals in optical metrology, in accordance with an embodiment of the present invention.

Referring to operation 702 of Flowchart 700, a method for improving computation efficiency for diffraction signals in optical metrology includes simulating a set of spatial harmonics orders for a grating structure.

Referring to operation 704 of Flowchart 700, the method for improving computation efficiency for diffraction signals in optical metrology includes truncating the set of spatial harmonics orders to provide a first truncated set of spatial harmonics orders based on a first pattern. In accordance with an embodiment of the present invention, the first pattern is corner-free. In one embodiment, the first pattern is elliptical, such as but not limited to circular. In an embodiment, subsequent to the simulating and prior to the truncating, the spatial harmonics orders within the set of spatial harmonics orders are prioritized, and truncating the set of spatial harmonics orders to provide the first truncated set of spatial harmonics orders is based on the prioritizing.

Referring to operation 706 of Flowchart 700, the method for improving computation efficiency for diffraction signals in optical metrology includes subtracting, by an iterative process, one or more individual spatial harmonics orders from the first truncated set of spatial harmonics orders to provide a second truncated set of spatial harmonics orders based on a second pattern, the second pattern different from the first pattern.

Referring to operation 708 of Flowchart 700, the method for improving computation efficiency for diffraction signals in optical metrology includes adding, by an iterative process, one or more individual spatial harmonics orders to the second truncated set of spatial harmonics orders to provide a third truncated set of spatial harmonics orders based on a third pattern, the third pattern different from the first and second patterns. In an alternative embodiment, the adding of operation 708 is performed before the subtracting of operation 706.

Referring to operation 710 of Flowchart 700, the method for improving computation efficiency for diffraction signals in optical metrology includes providing a simulated spectrum based on the third truncated set of spatial harmonics orders. In accordance with an embodiment of the present invention, by using a truncated set of spatial harmonics orders for the computation, the computation cost for providing the simulated spectrum is lower relative to the cost for a computation based on a complete spatial harmonics order set. Only a negligible amount of information for a grating structure is excluded from the computation because the truncated set was determined by selecting the optimal truncation approach.

In one embodiment, the simulated spectrum obtained from the truncated set of spatial harmonics orders is then compared to a sample spectrum. In a specific embodiment, the sample spectrum is collected from a structure such as, but not limited to, a physical reference sample or a physical production sample. In another specific embodiment, the sample spectrum is collected from a hypothetical structure for which a simulated spectrum is obtained by a method not involving spatial harmonics order truncation. In that embodiment, the quality of the more efficient simulation based on a truncated diffraction set can be determined.

In an aspect of the present invention, an initial shape may have individual modes subtracted in a uniform and iterative manner. For example, FIGS. 8A-8D represent operations in a method for improving computation efficiency for simulated diffraction signals in optical metrology, in accordance with an embodiment of the present invention.

Figure 8A:
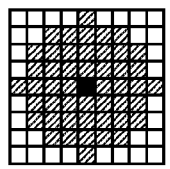
FIG. 8A represents an operation in a method for improving computation efficiency for simulated diffraction signals in optical metrology, in accordance with an embodiment of the present invention.

Referring to FIG. 8A, a "shaving" algorithm is an exhaustive search for the Fourier mode patterns (a.k.a. TOP, "truncation order pattern") which causes the smallest change in spectra at the maximum theoretical speed-up. In accordance with an embodiment of the present invention, the strategy includes computing a reference spectrum, using an initial TOP. For example, a possible initial circular pattern with truncation order (TO) where TO=4×4 is provided in FIG. 8A. The shaded modes are retained, while the non-shaded modes are eliminated.

Figure 8B:
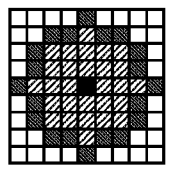
FIG. 8B represents an operation in a method for improving computation efficiency for simulated diffraction signals in optical metrology, in accordance with an embodiment of the present invention.

Referring to FIG. 8B, all the modes on the periphery of the current pattern are identified (darker shading in FIG. 8B). The definition of a mode on the periphery is a mode which shares at least one side with another mode that is not selected (i.e. there is at least one unselected mode that has a Fourier index which differs from the periphery mode by 1). In the example shown, the error generated by the elimination of each Fourier mode on the periphery of the current pattern is tested, as described in association with FIG. 8C.

Figure 8C:
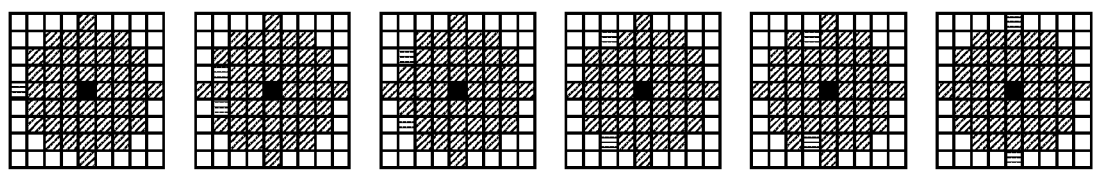
FIG. 8C represents an operation in a method for improving computation efficiency for simulated diffraction signals in optical metrology, in accordance with an embodiment of the present invention.

Referring to FIG. 8C, moving from left to right, the modes on the periphery with horizontal hatching shading are tested iteratively, going around the perimeter of the initial shape (note that only 56 instances are shown for illustrative purposes.) For example, 8C depicts several candidates, assuming symmetry. The mode under test is marked in horizontal hatching shading, and is the one or pair temporarily eliminated for this test, as described in association with FIG. 8D.

Figure 8D:
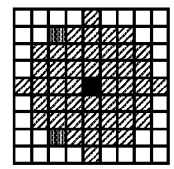
FIG. 8D represents an operation in a method for improving computation efficiency for simulated diffraction signals in optical metrology, in accordance with an embodiment of the present invention.

Referring to FIG. 8D, among the periphery modes tested, the one with the smallest error is selected for elimination, e.g., the modes with vertical hatching shading. The process is then repeated in an iterative manner. In an embodiment, the iterative process is halted when some maximum acceptable error is reached.

In accordance with an embodiment of the present invention, computations are based on a baseline for timing data for a first crude estimate. In an exemplary embodiment, computing RCWA for a 3D structure with ~21 slabs, using a truncation order TO=n×n=4×4, with symmetry acceleration, without TOPs, took 2.4 seconds for one wavelength, one ray, on one processor: $t_1 = k_s \cdot n^6 = k_s \cdot 4^6 = 2.4$ s where $k_s$ is a constant specific for a symmetric structure/illumination. From here: $k_s \approx 5.9 \cdot 10^{-4}$ s. For simplicity, a square pattern with TO=$n_0 \times n_0$ is used, which will also be the reference used to estimate the spectral error. The size of the square pattern will be $=(2n_0+1) \times (2n_0+1)$. The shaving process evolves in layers, such that after each layer is eliminated, the pattern is a square whose side is smaller than the previous by 2 (i.e. the TO is reduced at each layer by 1 in X and in Y). This is a very rough approximation. The size of each square pattern will be $=(2n+1) \times (2n+1)$, where n decreases from $n_0$ down to 1 (actually, the process will stop earlier by hitting an error threshold, so this is another approximation). Under these assumptions, the computational cost estimated from the inner loop going outside, will be around TO=n, the time per point per wavelength per CPU will be $t_1 = k_s \cdot n^6$. The number of patterns tested at each TO=n will be approximately 4n (i.e. half the modes on the periphery, because we assume symmetry). After each series of tests, one periphery mode will be eliminated, so the series will be repeated approximately 4n times. Finally, the process is repeated for n=$n_0$, $n_0$-1, $n_0$-2, . . . , 1. The total estimated time will be:

$$t_{total} \approx \left(\sum_{n=1}^{n_0} 4n \cdot 4n\right) t_1 = 16 \cdot k_s \sum_{n=1}^{n_0} n^8 \approx 0.01 \cdot \sum_{n=1}^{n_0} n^8.$$

Using the above formula, again assuming one wavelength per processor with symmetry acceleration, the shaving TOP algorithm may still be very time-consuming even at moderately high TO. According to the time estimations above, in one embodiment, it can be practical only for TO≤5 with one wavelength per processor. At TO=6 and maybe 7, in one embodiment, a subset of wavelengths must be used. At moderately high TO, in one embodiment, only one profile can be tested.

In an aspect of the present invention, it is to be understood that in some circumstances there may be a fundamental limitation with the use of canned shapes. The above approaches work independently from wavelengths versus a canned approach that may not pair the most suitable shape for a particular wavelength. Nonetheless, a short-cut using electrical field spectra may be used to arrive at a first pattern for use in the above described approaches. For example, FIGS. 9A-9B illustrate an approach using initial shape short-cutting based on electric field spectra, in accordance with an embodiment of the present invention.

Referring to FIG. 9A, electric field spectra are determined at different wavelengths (e.g., 200 nanometers, 250 nanometers, 410 nanometers, 450 nanometers, 500 nanometers, 600 nanometers and 700 nanometers.) Referring to FIG. 9B, in an embodiment, a starting, or first pattern for the beginning of the iterative adding or subtracting approaches described above includes selection of an already modified shape (e.g., a standard diamond, an asymmetrical diamond, or a slim diamond), based on the crude approximation determined by the electric field spectra obtained or simulated.

Figure 10:
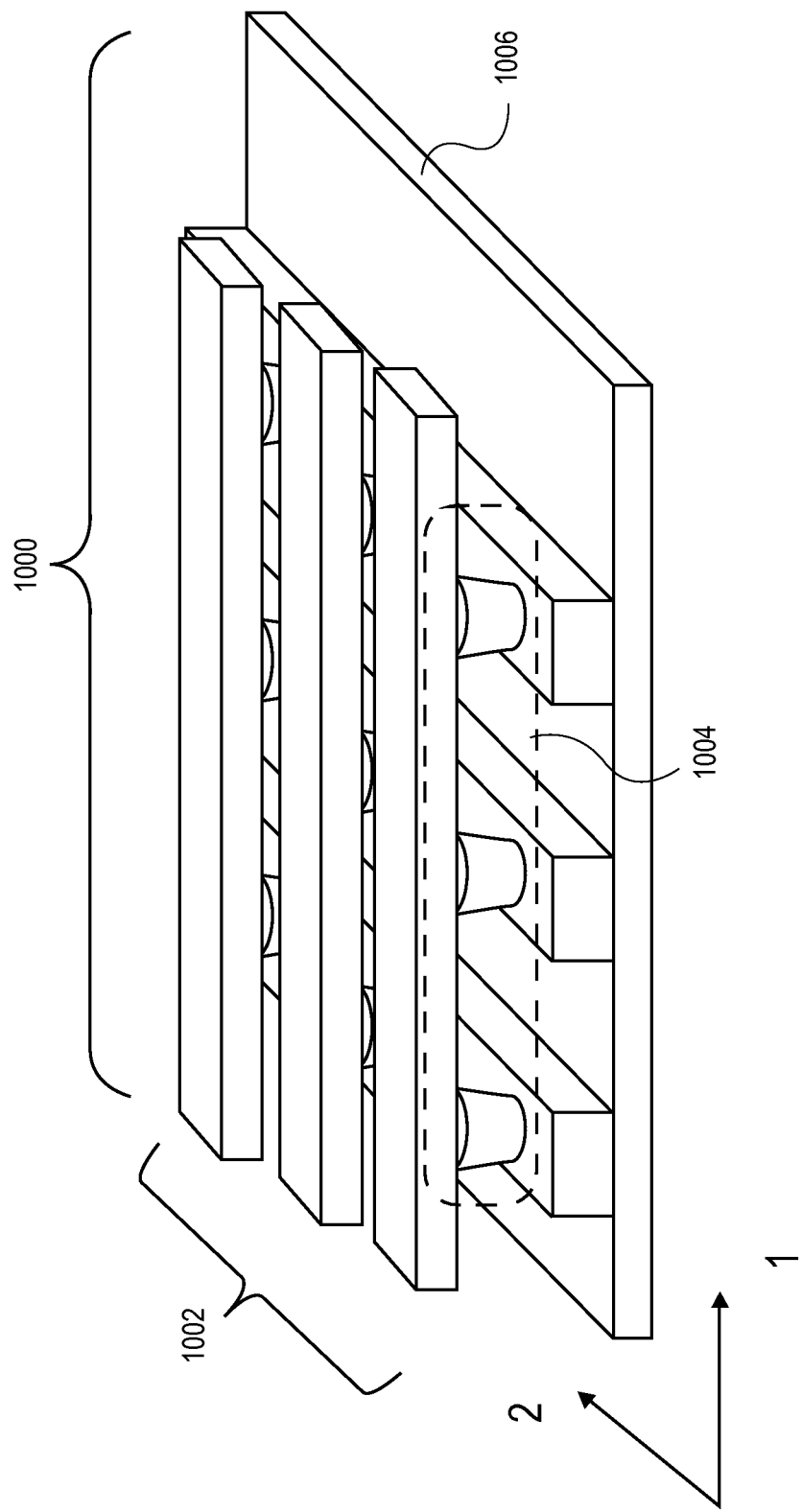
FIG. 10 represents a cross-sectional view of a structure having both a two-dimensional component and a three-dimensional component, in accordance with an embodiment of the present invention.

In another aspect of the present invention, a grating structure includes both a three-dimensional component and a two-dimensional component. The efficiency of a computation based on simulated diffraction data may be optimized by taking advantage of the simpler contribution by the two-dimensional component to the over all structure and the diffraction data thereof. FIG. 10 represents a cross-sectional view of a structure having both a two-dimensional component and a three-dimensional component, in accordance with an embodiment of the present invention. Referring to FIG. 10, a structure 1000 has a two-dimensional component 1002 and a three-dimensional component 1004 above a substrate 1006. The grating of the two-dimensional component runs along direction 2, while the grating of the three-dimensional component runs along both directions 1 and 2. In one embodiment, direction 1 is orthogonal to direction 2, as depicted in FIG. 10. In another embodiment, direction 1 is non-orthogonal to direction 2.

In order to facilitate the description of embodiments of the present invention, an ellipsometric optical metrology system is used to illustrate the above concepts and principles. It is to be understood that the same concepts and principles apply equally to the other optical metrology systems, such as reflectometric systems. In a similar manner, a semiconductor wafer may be utilized to illustrate an application of the concept. Again, the methods and processes apply equally to other work pieces that have repeating structures.

Figure 11:
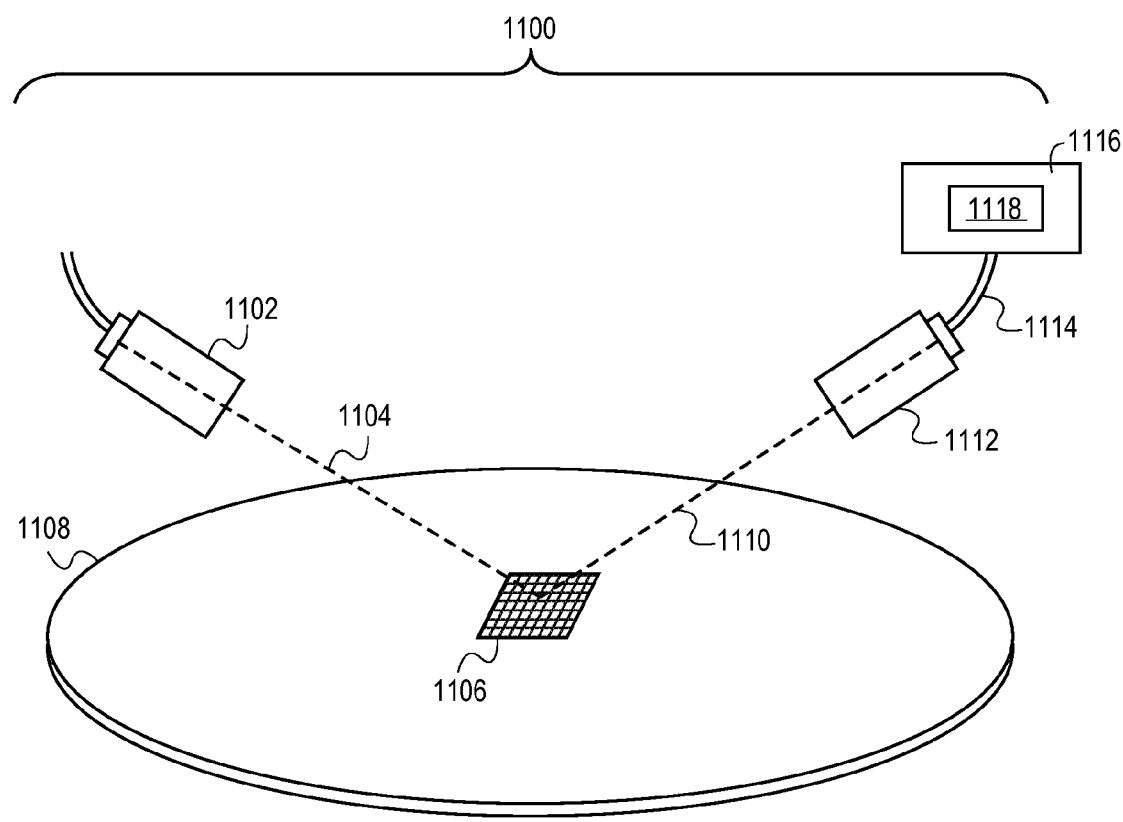
FIG. 11 is an architectural diagram illustrating the utilization of optical metrology to determine the profiles of structures on a semiconductor wafer, in accordance with an embodiment of the present invention.

FIG. 11 is an architectural diagram illustrating the utilization of optical metrology to determine the profiles of structures on a semiconductor wafer, in accordance with an embodiment of the present invention. The optical metrology system 1100 includes a metrology beam source 1102 projecting a metrology beam 1104 at the target structure 1106 of a wafer 1108. The metrology beam 1104 is projected at an incidence angle θ towards the target structure 1106. The diffraction beam 1110 is measured by a metrology beam receiver 1112. The diffraction beam data 1114 is transmitted to a profile application server 1116. The profile application server 1116 compares the measured diffraction beam data 1114 against a library 1118 of simulated diffraction beam data representing varying combinations of critical dimensions of the target structure and resolution.

In accordance with an embodiment of the present invention, at least a portion of the simulated diffraction beam data is based on an iteratively determined truncated set of spatial harmonics orders. In one exemplary embodiment, the library 1118 instance best matching the measured diffraction beam data 1114 is selected. It is to be understood that although a library of diffraction spectra or signals and associated hypothetical profiles is frequently used to illustrate concepts and principles, the present invention applies equally to a data space comprising simulated diffraction signals and associated sets of profile parameters, such as in regression, neural network, and similar methods used for profile extraction. The hypothetical profile and associated critical dimensions of the selected library 1116 instance is assumed to correspond to the actual cross-sectional profile and critical dimensions of the features of the target structure 1106. The optical metrology system 1100 may utilize a reflectometer, an ellipsometer, or other optical metrology device to measure the diffraction beam or signal.

Embodiments of the present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 12:
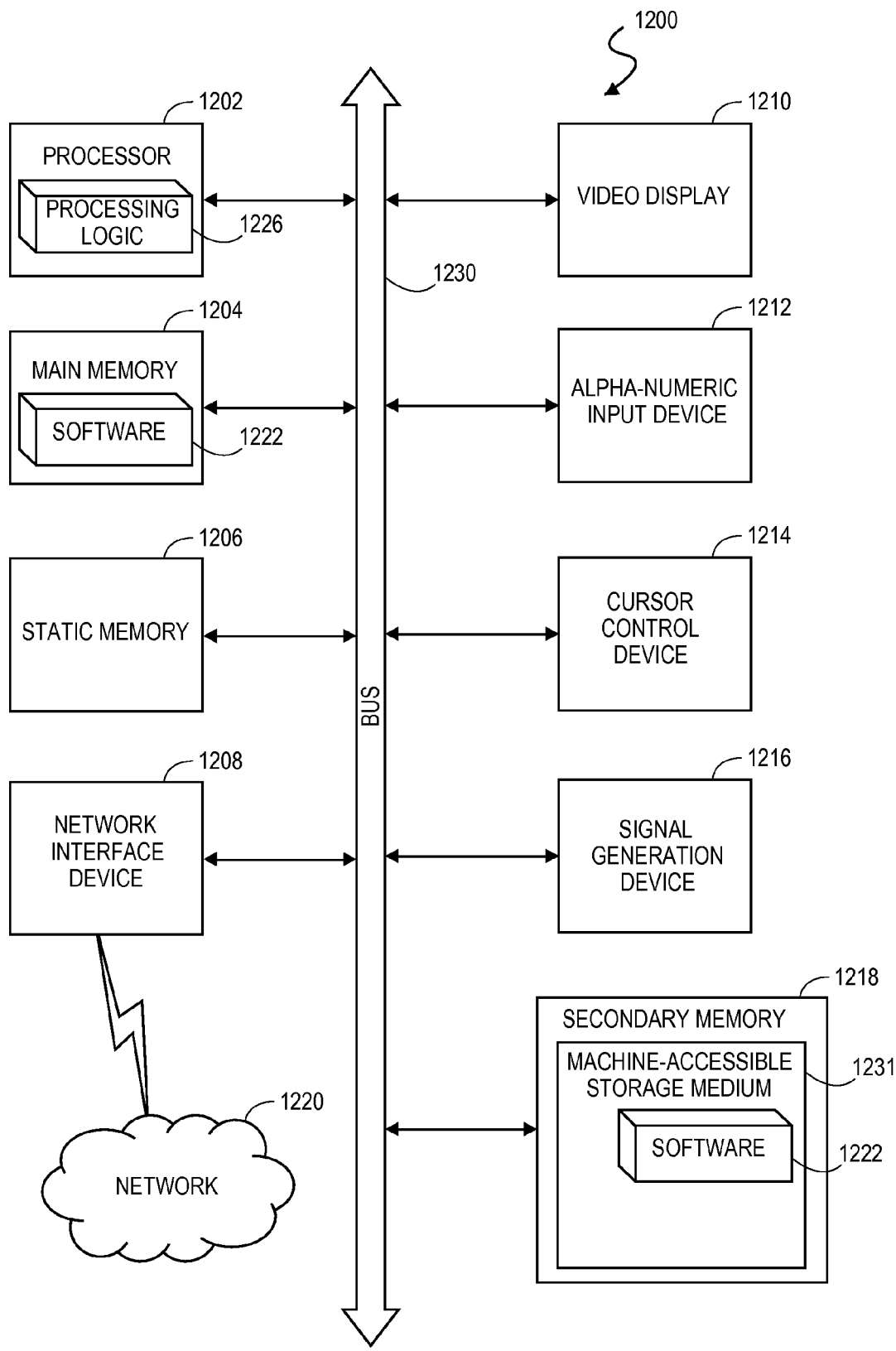
FIG. 12 illustrates a block diagram of an exemplary computer system, in accordance with an embodiment of the present invention.

FIG. 12 illustrates a diagrammatic representation of a machine in the exemplary form of a computer system 1200 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1200 includes a processor 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a secondary memory 1218 (e.g., a data storage device), which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1202 may also be one or more special-purpose processing devices such as an application specific integrated circuit (ASIC), a field programmable gate array (FPGA), a digital signal processor (DSP), network processor, or the like. Processor 1202 is configured to execute the processing logic 1226 for performing the operations discussed herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The secondary memory 1218 may include a machine-accessible storage medium (or more specifically a computer-readable storage medium) 1231 on which is stored one or more sets of instructions (e.g., software 1222) embodying any one or more of the methodologies or functions described herein. The software 1222 may also reside, completely or at least partially, within the main memory 1204 and/or within the processor 1202 during execution thereof by the computer system 1200, the main memory 1204 and the processor 1202 also constituting machine-readable storage media. The software 1222 may further be transmitted or received over a network 1220 via the network interface device 1208.

While the machine-accessible storage medium 1231 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

In accordance with an embodiment of the present invention, a machine-accessible storage medium has instructions stored thereon which cause a data processing system to perform a method for improving computation efficiency for diffraction signals in optical metrology. The method includes simulating a set of spatial harmonics orders for a grating structure, truncating the set of spatial harmonics orders to provide a first truncated set of spatial harmonics orders based on a first pattern, modifying, by an iterative process, the first truncated set of spatial harmonics orders to provide a second truncated set of spatial harmonics orders based on a second pattern, the second pattern different from the first pattern, and providing a simulated spectrum based on the second truncated set of spatial harmonics orders.

In one embodiment, modifying the first truncated set of spatial harmonics orders includes subtracting one or more individual spatial harmonics orders to provide the second truncated set of spatial harmonics orders, wherein the second pattern is smaller than the first pattern. In one embodiment, modifying the first truncated set of spatial harmonics orders includes adding one or more individual spatial harmonics orders to provide the second truncated set of spatial harmonics orders, wherein the second pattern is larger than the first pattern. In one embodiment, the first pattern is corner-free. In a specific embodiment, the first pattern is elliptical, such as but not limited to circular. In one embodiment, the storage medium has instructions stored thereon which cause a data processing system to perform the method further including, subsequent to the simulating and prior to the truncating, prioritizing the spatial harmonics orders within the set of spatial harmonics orders, wherein truncating the set of spatial harmonics orders to provide the first truncated set of spatial harmonics orders is based on the prioritizing. In one embodiment, the storage medium has instructions stored thereon which cause a data processing system to perform the method further including comparing the simulated spectrum to a sample spectrum.

In accordance with another embodiment of the present invention, a machine-accessible storage medium has instructions stored thereon which cause a data processing system to perform a method for improving computation efficiency for diffraction signals in optical metrology. The method includes simulating a set of spatial harmonics orders for a grating structure, truncating the set of spatial harmonics orders to provide a first truncated set of spatial harmonics orders based on a first pattern, subtracting, by an iterative process, one or more individual spatial harmonics orders from the first truncated set of spatial harmonics orders to provide a second truncated set of spatial harmonics orders based on a second pattern, the second pattern different from the first pattern, adding, by an iterative process, one or more individual spatial harmonics orders to the second truncated set of spatial harmonics orders to provide a third truncated set of spatial harmonics orders based on a third pattern, the third pattern different from the first and second patterns, and providing a simulated spectrum based on the third truncated set of spatial harmonics orders.

In one embodiment, the first pattern is corner-free. In a specific embodiment, the first pattern is elliptical, such as but not limited to circular. In one embodiment, the storage medium has instructions stored thereon which cause a data processing system to perform the method further including, subsequent to the simulating and prior to the truncating, prioritizing the spatial harmonics orders within the set of spatial harmonics orders, wherein truncating the set of spatial harmonics orders to provide the first truncated set of spatial harmonics orders is based on the prioritizing. In one embodiment, the storage medium has instructions stored thereon which cause a data processing system to perform the method further including comparing the simulated spectrum to a sample spectrum.

Thus, a method for improving computation efficiency for diffraction signals in optical metrology has been disclosed. In accordance with an embodiment of the present invention, a method includes simulating a set of spatial harmonics orders for a grating structure. The set of spatial harmonics orders is truncated to provide a first truncated set of spatial harmonics orders based on a first pattern. The first truncated set of spatial harmonics orders is modified by an iterative process to provide a second truncated set of spatial harmonics orders based on a second pattern, the second pattern different from the first pattern. A simulated spectrum is provided based on the second truncated set of spatial harmonics orders. In one embodiment, modifying the first truncated set of spatial harmonics orders includes subtracting one or more individual spatial harmonics orders to provide the second truncated set of spatial harmonics orders, wherein the second pattern is smaller than the first pattern. In one embodiment, modifying the first truncated set of spatial harmonics orders comprises adding one or more individual spatial harmonics orders to provide the second truncated set of spatial harmonics orders, wherein the second pattern is larger than the first pattern.

What is claimed is:

1. A method for improving computation efficiency for diffraction signals in optical metrology, the method comprising:
   simulating a set of spatial harmonics orders for a grating structure;
   truncating the set of spatial harmonics orders to provide a first truncated set of spatial harmonics orders based on a first pattern, the first truncated set of spatial harmonics orders having fewer spatial harmonics orders than the set of spatial harmonics orders; and, subsequently,
   subtracting, by an iterative process, one or more individual spatial harmonics orders from the first truncated set of spatial harmonics orders to provide a second truncated set of spatial harmonics orders based on a second pattern, the second pattern different from the first pattern;
   adding, by an iterative process, one or more individual spatial harmonics orders to the second truncated set of spatial harmonics orders to provide a third truncated set of spatial harmonics orders based on a third pattern, the third pattern different from the first and second patterns; and
   providing a simulated spectrum based on the third truncated set of spatial harmonics orders.

2. The method of claim 1, wherein the first pattern is corner-free and is selected from the group consisting of circular and elliptical.

3. The method of claim 1, further comprising:
   subsequent to the simulating and prior to the truncating, prioritizing the spatial harmonics orders within the set of spatial harmonics orders, wherein truncating the set of spatial harmonics orders to provide the first truncated set of spatial harmonics orders is based on the prioritizing.

4. The method of claim 1, further comprising:
   comparing the simulated spectrum to a sample spectrum.

5. A non-transitory machine-accessible storage medium having instructions stored thereon which cause a data processing system to perform a method for improving computation efficiency for diffraction signals in optical metrology, the method comprising:
   simulating a set of spatial harmonics orders for a grating structure;
   truncating the set of spatial harmonics orders to provide a first truncated set of spatial harmonics orders based on a first pattern, the first truncated set of spatial harmonics orders having fewer spatial harmonics orders than the set of spatial harmonics orders; and, subsequently,
   subtracting, by an iterative process, one or more individual spatial harmonics orders from the first truncated set of spatial harmonics orders to provide a second truncated set of spatial harmonics orders based on a second pattern, the second pattern different from the first pattern;
   adding, by an iterative process, one or more individual spatial harmonics orders to the second truncated set of spatial harmonics orders to provide a third truncated set of spatial harmonics orders based on a third pattern, the third pattern different from the first and second patterns; and
   providing a simulated spectrum based on the third truncated set of spatial harmonics orders.

6. The non-transitory storage medium as in claim 5, wherein the first pattern is corner-free and is selected from the group consisting of circular and elliptical.

7. The non-transitory storage medium as in claim 5, having instructions stored thereon which cause a data processing system to perform the method further comprising:
   subsequent to the simulating and prior to the truncating, prioritizing the spatial harmonics orders within the set of spatial harmonics orders, wherein truncating the set of spatial harmonics orders to provide the first truncated set of spatial harmonics orders is based on the prioritizing.

8. The non-transitory storage medium as in claim 5, having instructions stored thereon which cause a data processing system to perform the method further comprising:
comparing the simulated spectrum to a sample spectrum.

* * * * *